US012700762B2

(12) United States Patent
Rathnam et al.

(10) Patent No.: US 12,700,762 B2
(45) Date of Patent: Aug. 4, 2026

(54) ELECTRIC MOTOR ROTOR ASSEMBLY HAVING MAGNET RETENTION FEATURE

(71) Applicant: Ford Global Technologies, LLC, Dearborn, MI (US)

(72) Inventors: Singar Rathnam, Farmington Hills, MI (US); Arun Rao Madharapu, Westland, MI (US); Matthew Schmitt, Southgate, MI (US); Jacob Krizan, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 374 days.

(21) Appl. No.: 18/311,545

(22) Filed: May 3, 2023

(65) Prior Publication Data

US 2024/0372423 A1 Nov. 7, 2024

(51) Int. Cl.
*H02K 1/274* (2022.01)
*H02K 1/28* (2006.01)

(52) U.S. Cl.
CPC .............. *H02K 1/274* (2013.01); *H02K 1/28* (2013.01)

(58) Field of Classification Search
CPC ........ H02K 1/274; H02K 1/28; H02K 1/2766; H02K 1/276
See application file for complete search history.

(56) References Cited

U.S. PATENT DOCUMENTS

| | | | |
|---|---|---|---|
| 8,674,580 B2 | 3/2014 | Carter | |
| 2016/0248286 A1* | 8/2016 | Kaiser | H02K 1/2766 |
| 2021/0028662 A1* | 1/2021 | Tang | H02K 1/2766 |
| 2022/0131431 A1 | 4/2022 | Coppola et al. | |
| 2022/0234204 A1 | 7/2022 | Briscoe et al. | |

FOREIGN PATENT DOCUMENTS

DE 102020103397 A1 8/2021

* cited by examiner

*Primary Examiner* — Christopher M Koehler
*Assistant Examiner* — Riley Owen Stout
(74) *Attorney, Agent, or Firm* — David B. Kelley; Brooks Kushman, P.C.

(57) ABSTRACT

A rotor assembly includes a rotor core that defines a plurality of cavities and includes a plurality of laminations having annular bodies and stackably arranged to form the rotor core. The plurality of laminations includes a plurality of notch laminations and at least one tab lamination. Each notch lamination defines a plurality of first apertures. Each first aperture has a notch at a portion of the first aperture. The tab lamination defines a plurality of second apertures and includes flexible tabs extending toward the second apertures. The plurality of first apertures and the plurality of second apertures define at least a portion of the plurality of the cavities. A set of notch laminations are stacked with the tab lamination, where the notches of the set of notch laminations align with the flexible tabs of the tab lamination.

16 Claims, 5 Drawing Sheets

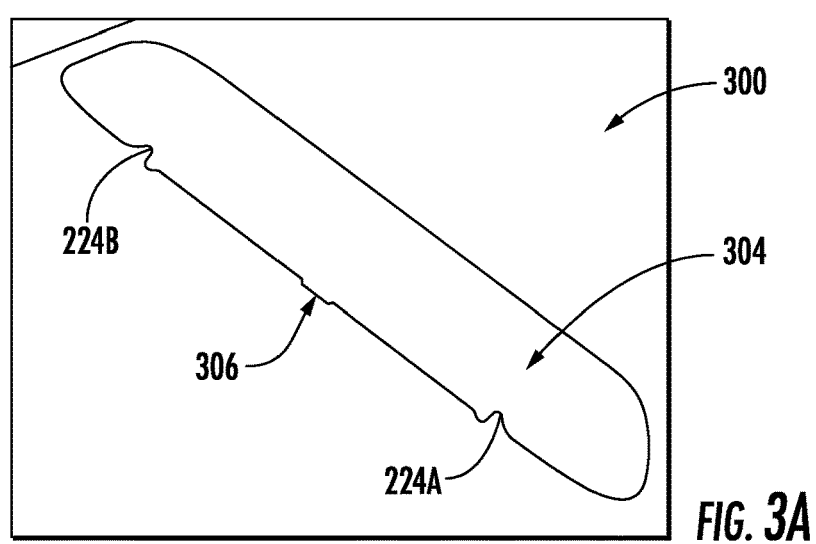
FIG. *3A*
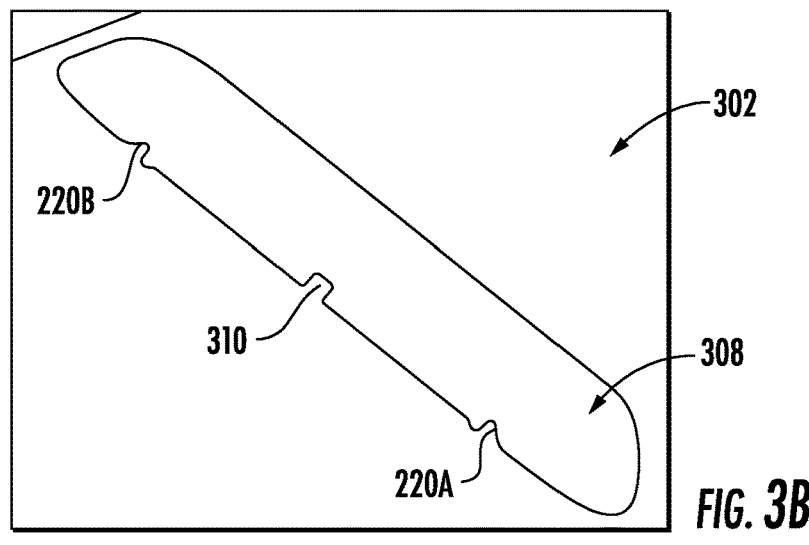
FIG. *3B*
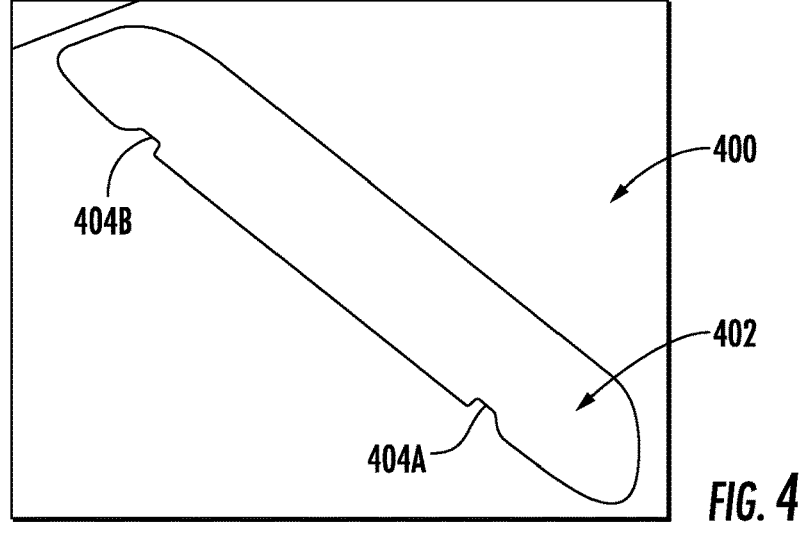
FIG. *4*

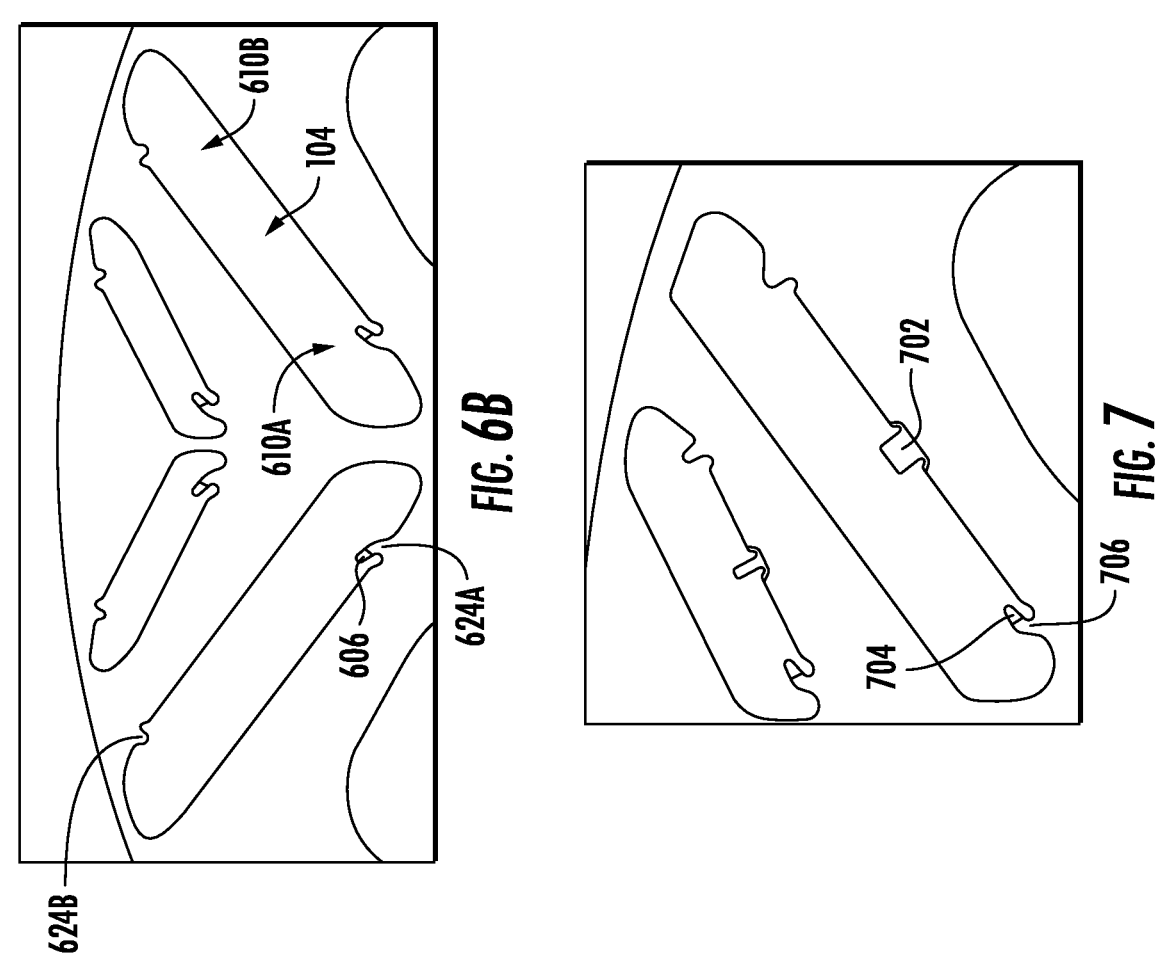
FIG. 6B
FIG. 7
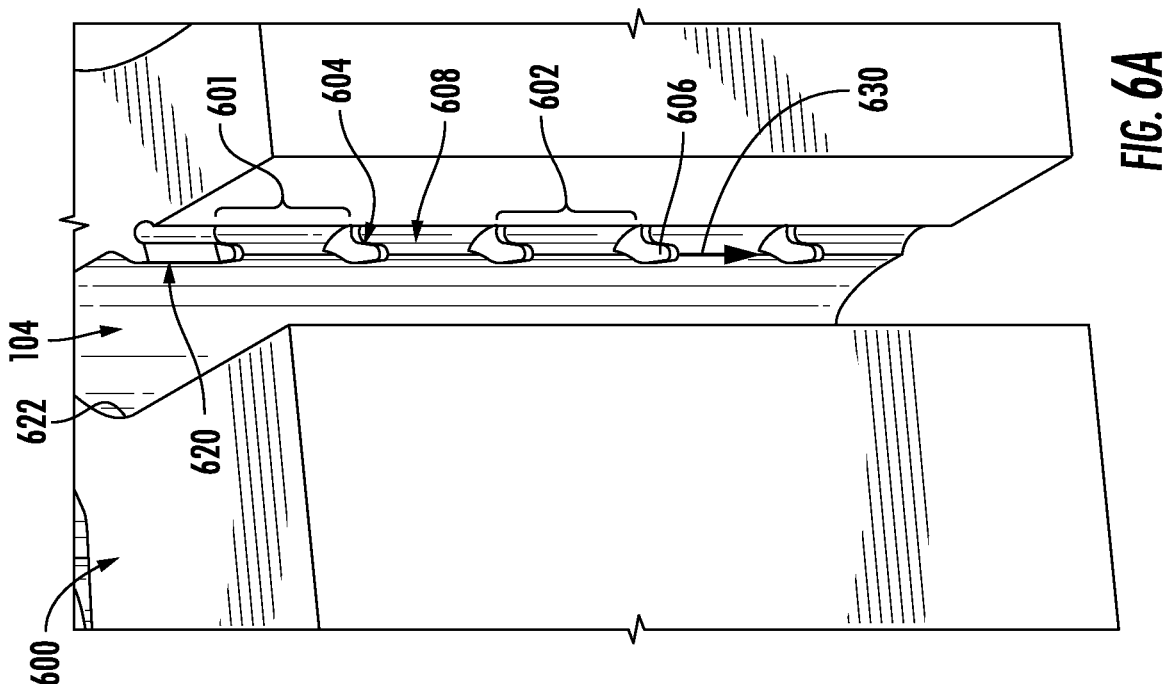
FIG. 6A

ELECTRIC MOTOR ROTOR ASSEMBLY HAVING MAGNET RETENTION FEATURE

TECHNICAL FIELD

The present disclosure relates to a rotor assembly for an electric motor, and more particularly, to a rotor assembly having a rotor core defined by lamination stack.

BACKGROUND

Electric machines typically employ a rotor and stator to produce torque. Electric current flows through the stator windings to produce a magnetic field. The magnetic field generated by the stator may cooperate with permanent magnets within the rotor to generate torque.

SUMMARY

This section provides a general summary of the disclosure and is not a comprehensive disclosure of its full scope or all of its features.

In one form, the present disclosure is directed to a rotor assembly for an electric motor. The rotor assembly includes a rotor core defining a plurality of cavities and a plurality of magnets provided in the plurality of cavities. The rotor core further includes a plurality of laminations stackably arranged forming the rotor core. The plurality of laminations includes a plurality of notch laminations and at least one tab lamination. Each notch lamination has an annular body and defines a plurality of first apertures. Each first aperture has a notch at a portion of the first aperture. The at least one tab lamination has an annular body, and defines a plurality of second apertures. The at least one tab lamination includes flexible tabs extending toward the second apertures. The plurality of first apertures and the plurality of second apertures define at least a portion of the plurality of the cavities. A set of notch laminations from among the plurality of notch laminations are stacked with the at least one tab lamination, and the notches of the set of notch laminations align with the flexible tabs of the tab lamination. The flexible tabs of the at least one tab lamination bends toward the notches of the set of notch laminations by a magnet from among the plurality of magnets.

In one form, the present disclosure is directed to a rotor assembly for an electric motor. The rotor assembly includes a rotor core defining a plurality of cavities and comprising a plurality of laminations stackably arranged forming the rotor core. The plurality of laminations includes a plurality of notch laminations having annular bodies, and each notch lamination defines a plurality of first apertures. Each first aperture has a notch at a portion of the first aperture. The plurality of laminations further includes a plurality of tab laminations having annular bodies. The plurality of tab lamination defines a plurality of second apertures and includes flexible tabs extending toward the second apertures. A portion of the plurality of laminations form a subset of stacked laminations. The subset of stacked laminations includes one tab lamination from among the plurality of tab laminations and a set of notch laminations from among the plurality of notch laminations stacked with the one tab lamination. The first apertures of the set of notch laminations align with the second aperture of the one tab lamination to form a portion of the plurality of cavities. The flexible tabs of the one tab lamination bends towards the notches of the set of notch laminations.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIG. 3A is partial view of another form of a notch lamination in accordance with the preset disclosure;

FIG. 3B is partial view of another form of a tab lamination in accordance with the preset disclosure;

FIG. 4 is partial view of a stopper lamination in accordance with the present disclosure;

FIG. 6A is a partial cross-sectional view of the rotor core having another form of a plurality of subset of stacked laminations in accordance with the present disclosure;

FIG. 6B is a partial top view of the rotor core of FIG. 6A; and

FIG. 7 is a partial top view of the rotor core having another form of a notch lamination and a tab lamination in accordance with the present disclosure.

Figure 1:
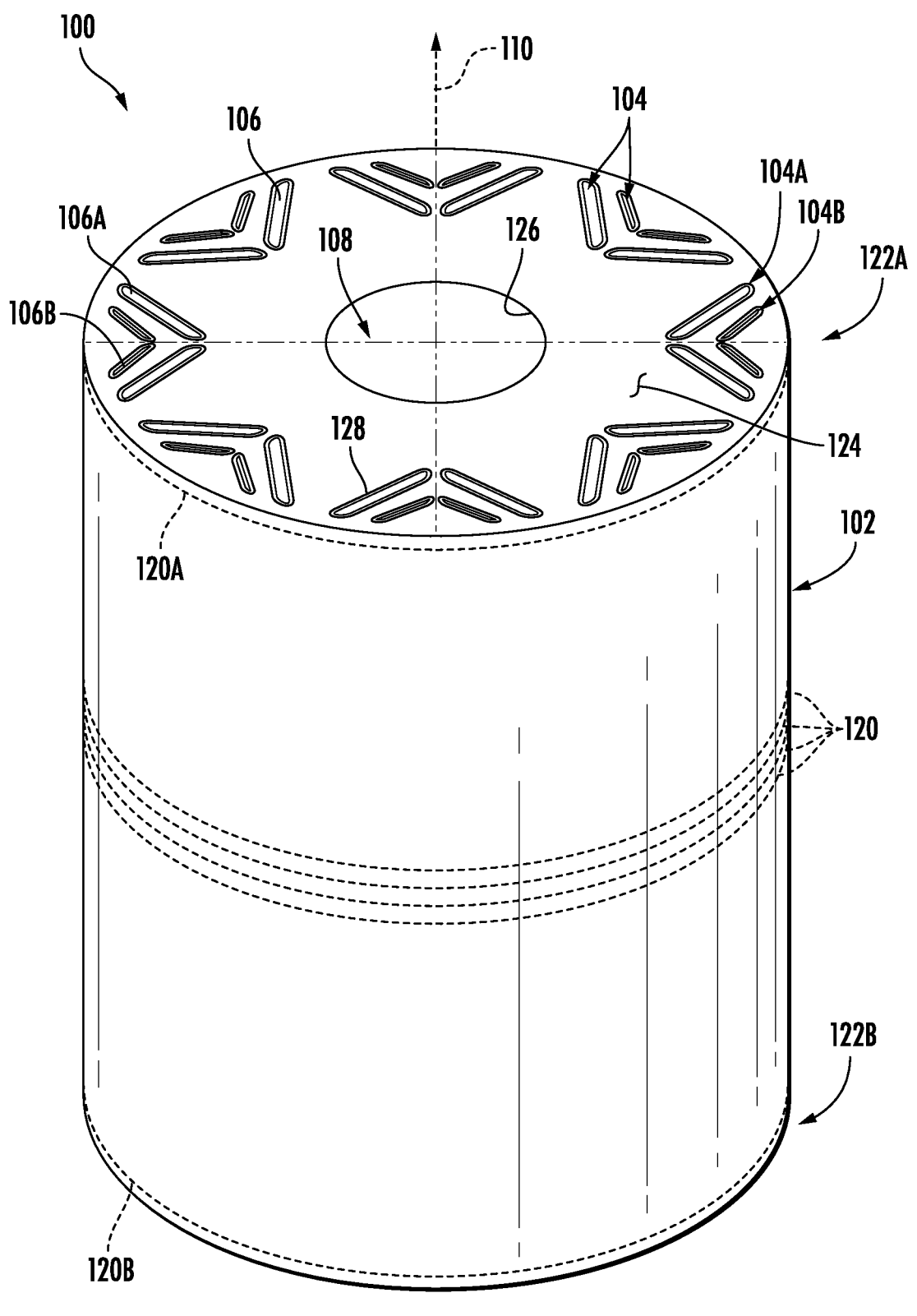
FIG. 1 is perspective view of a rotor assembly for an electric motor in accordance with the preset disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a rotor assembly 100 includes a rotor core 102 defining a plurality of cavities 104 and a plurality of magnets 106 arranged in the plurality of cavities 104. The rotor core 102 further defines a bore 108 for a rotor shaft (not shown) that is secured to and rotated by the rotor core 102. Stated differently, as part of an electric motor having a stator assembly, the rotor assembly 100 is connected to another component or device via the rotor shaft. The rotor assembly 100 rotates about a center axis 110 due to an electromagnetic force generated by the stator assembly.

In one form, each cavity 104 may include a single magnet 106 extending through the cavity 104 or may include multiple magnets 106 that are stacked within the cavity 104. Accordingly, in the following, if the cavity 104 is described in relation to the "magnet", the number of magnets 106 in the cavity 104 may be one or more and should not be limited to one.

In some applications, the rotor core 102 is configured to house different size magnets 106. Specifically, the cavities 104 may include a first set of cavities 104A and a second set of cavities 104B smaller in size than the first set of cavities 104. The magnets 106 include a first set of magnets 106A and a second set of magnets 106B smaller than the first set of magnets 106A. The first set of cavities 104A house the first set of magnets 106 and the second set of cavities 104B house the second set of magnets 106. While the rotor assembly 100 of FIG. 1 includes different size cavities 104 and magnets 106, the present disclosure is applicable to a rotor assembly having same size cavities 104 and same size magnets 106.

In one form, the rotor core 100 includes a plurality of laminations (i.e., laminated plates) 120 that are stackably arranged forming the rotor core 102. The laminations 120 may be fabricated from a material such iron or steel. The laminations 120 are stacked or aligned in an axial direction (i.e., along the center axis 110). A first end lamination 120A among the plurality of laminations 120 forms a first end 122A of the rotor core 102 and a second end lamination 120B forms a second end of the rotor core 102 opposite of the first end 122A.

Referring to the first end lamination 120A, each lamination 120 has an annular body 124 defining a center hole 126 and a plurality of apertures 128. When the laminations 120 are stacked to form the rotor core 102, the center holes 126 define the bore 108 and the apertures 128 define the cavities 104.

The laminations 120 may be stacked "loose", welded, or bonded together depending on the desired application. The laminations 120 may include a thin layer of insulating material (e.g., a thin layer of epoxy that is approximately 0.001 mm thick). There may or may not be small spaces between adjacent laminations 120 at locations where the adjacent laminations 120 are not affixed to each other, if the application requires the adjacent laminations to be affixed to each other (i.e., via welding or bonding).

The magnets 106 are secured to respective cavity 104 to inhibit the magnets 106 from falling out of the cavity 104 during operation of the rotor assembly 100. Even during assembly, the magnets 106 may be at least partially secured to the rotor core 102 to inhibit the magnets 106 from falling out of the rotor core 102. Specifically, the magnets 106 are inserted into the cavities 104, and the rotor core 102 having the magnets 106 may be transferred to different locations of the manufacturing process. At times, such as when the magnets 106 and the cavities 104 have a slip fit with each other, one or more magnets 106 can fall out of the rotor core during the transfer.

Different techniques can be employed for partially securing the magnets in the cavities. In a non-limiting example, a mandrel may be employed to axially center and stack the laminations of the rotor core. The mandrel may include a plate to laterally support the rotor core. and the plate may abut with the magnets to prevent the magnets from falling out. However, during the assembly process, portions of rotor core may get stuck to an outer diameter of the mandrel making it difficult to remove the rotor core from the mandrel without potentially loosening one or more magnets from the cavities 104.

In one form, the rotor assembly 100 of the present disclosure includes different types of laminations 120 that are adapted to partially support the magnets 106 in the cavities 104 to inhibit the magnets 106 from falling out. Specifically, and as described herein, the rotor core 102 includes at least one flexible tab in each cavity 104. The flexible tab has a press fit with the magnet 106 and, in some implementations, provides a biasing force on the magnet 106 to have the magnet press against an inner surface of the cavity 104. In addition, the stacking arrangement of the laminations 120 allow for different securing levels to support and retain the magnets 106 in the cavities.

Figure 2A:
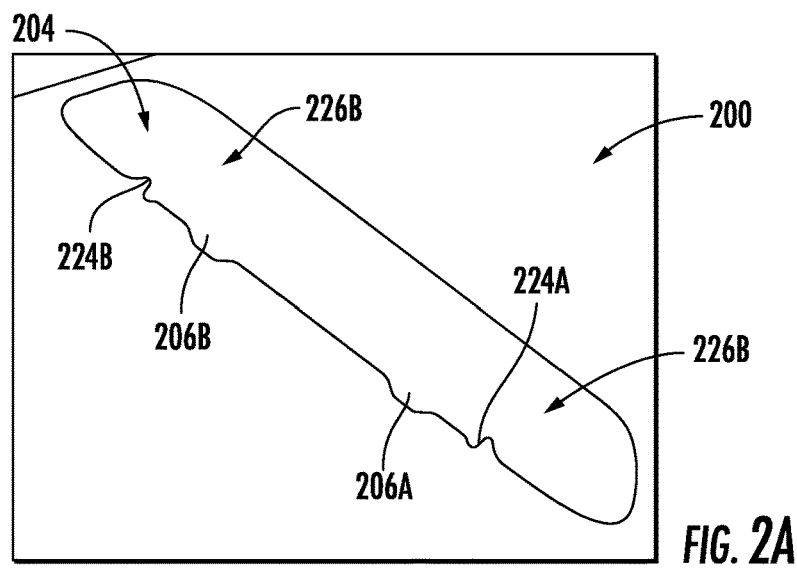
FIG. 2A is partial view of a notch lamination in accordance with the preset disclosure.
Figure 2B:
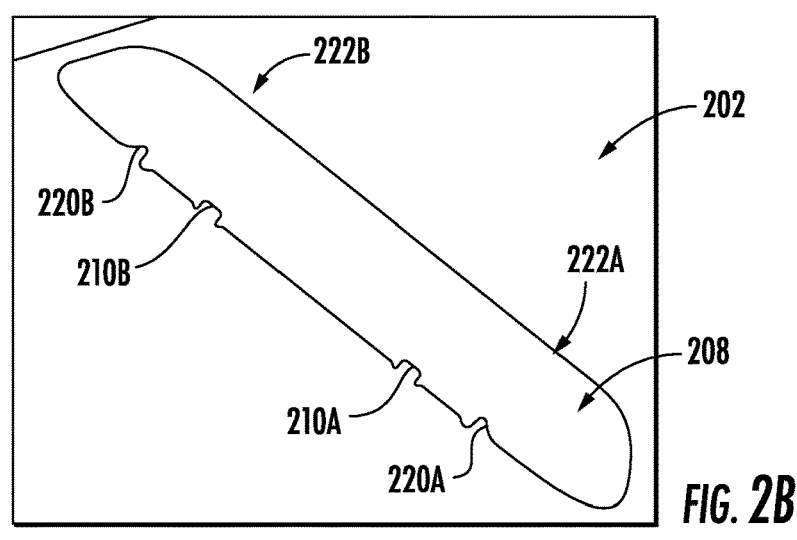
FIG. 2B is partial view of a tab lamination in accordance with the preset disclosure.
Figure 2C:
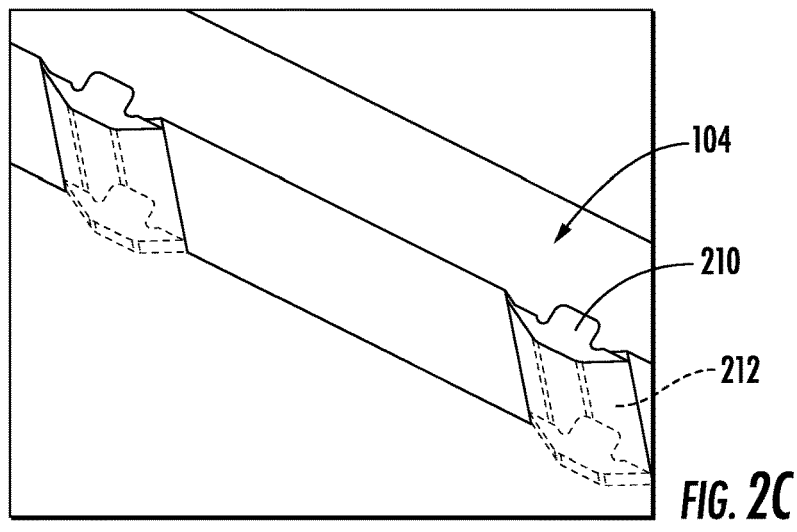
FIG. 2C is a partial view of a rotor core having the notch lamination and the tab lamination of FIGS. 2A and 2B.

Referring to FIGS. 2A, 2B, and 2C, in one form, the plurality of laminations 120 includes a notch lamination 200 and a tab lamination 202, which collectively may be referred to as laminations 200, 202. FIGS. 2A and 2B illustrate a portion of the notch lamination 200 and the tab lamination 202, and therefore, while a single feature may be illustrated (e.g., a single aperture), the laminations 200, 202 may have a plurality of the features. In addition, while one notch lamination 200 and one tab lamination is illustrated, the plurality of laminations 120 may include a plurality of notch laminations 200 and a plurality of tab laminations 202.

In one form, the notch lamination 200 defines a plurality of first apertures 204, where each first aperture 204 has notches 206A, 206B at portions of the first aperture 204. Stated differently, an edge of the annular body defining the first aperture 204 includes concave portions defining the notches 206A,206B. The notches 206A,206B may collectively be referenced as notch 206.

In one form, the tab lamination 202 defines a plurality of second apertures 208. Each second aperture 208 includes flexible tabs 210A,210B that extend or protrude into or towards the second aperture 208. The flexible tabs 210A, 210B are adapted to bend or, in other words, flex in response to a force pushing on the tab. The flexible tabs 210A, 210B may collectively be referenced as flexible tab 210.

The notch laminations 200 and the tab lamination 202 are stacked such that the plurality of first apertures 204 and the plurality of second apertures 208 define, at least, a portion of the plurality of the cavities 104. In addition, the flexible tab 210 axially aligns with the notch 206.

Specifically, in one form, a set of notch laminations 200 from among a plurality of notch laminations 200 are stacked with the tab lamination 202 to have the notches 206 align with respective flexible tabs 210 of the tab lamination 202. The notches 206 of the set of notch laminations 200 define a trough or a depression 212 for the flexible tab 210 (FIG. 2C). That is, during assembly, the magnet 106 is inserted into the cavity 104 and bends the flexible tab 210 toward the depression 212 defined by the notches 206. The depression 212 provides a space for the flexible tab 210 to bend into making way for the magnet 106. In one form, the set of notch laminations 200 and a single tab lamination 202 are referenced as a subset of stacked laminations. In addition, the number of notch laminations 200 provided in the set of notch laminations is at least enough to define a depression that can receive the flexible tab 210 if the flexible tab 210 bends to be parallel to a surface of the depression (e.g., bends about 90 degrees).

In one form, the flexible tab 210 are adapted to have a press fit with the magnet 106 in the cavity 104 to retain the magnet 106 in the cavity 104. The desired level of support and biasing force to be provided to the magnet 106 may be controlled by at least the number of tab laminations 202 employed in the rotor core 102.

More particularly, in a non-limiting example, a single tab lamination may be employed to assist in holding the magnet 106 during, for example, an assembly process of the rotor core 102, but additional fastening mechanism, such as a resin, is employed to secure the magnets 106 within the cavities 104. As described further herein, additional tab laminations may be used to secure the magnet 106 within the cavity 104, so that the magnets 106 do not fall out during operation of the rotor assembly. Accordingly, the number of notch laminations and tab laminations forming the rotor core 102 may be selected based on, for example, manufacturing method, performance objectives and/or application of the rotor assembly 100.

While FIGS. 2A and 2B illustrate two notches 206 and two flexible tabs 210, one or more notches and tabs may be employed. In a non-limiting example, referring to FIGS. 3A and 3B, the laminations 120 may include a notch lamination 300 and a tab lamination 302 in lieu of laminations 200, 202. The notch lamination 300 defines a first aperture 304 having a single notch 306. The tab lamination 302 defines a second aperture 308 that includes a single flexible tab 310. Both the notch 306 and the flexible tab 310 are provided at a center portion of the first aperture 304 and the second aperture 308, respectively. In addition, the notch 306 and the flexible tab 310 are adapted to axially align when the laminations 300, 302 are stacked.

In the following description, variations/implementation of the notch lamination and the tab lamination may be described in relation to the notch lamination 200 and the tab lamination 202. However, the variations/implementation may also be applied to the notch lamination 300 and the tab lamination 302.

In one form, the shape of the notches 206 and the flexible tabs 210 should not be limited to the shape provided in the figures. For example, the flexible tabs 210 may have triangular-like shape having two sides extending from an edge of the second aperture 208.

With continuing reference to FIGS. 2B, in some applications, each tab lamination 202 further includes a pair of side tabs 220A, 220B to laterally retain or control the position of the magnet 106. Specifically, in one form, a first side tab 220A is provided at a first lateral side 222A of the second aperture 208 and a second side tab 220B is provided at a second lateral side 222B of the second aperture 208 opposite of the first lateral side 222A. The pair of side tabs 220A, 220B extend toward or, in other words, into the second aperture 208. The magnet 106 in the cavity 104 having the side tabs 220A,220B is held between the pair of side tabs 220A,220B.

Referring again to FIG. 2A, in some applications, the notch lamination 200 may also have a pair of side tabs 224A, 22B that are similar to the pair of side tabs of 220A, 220B of the tab lamination 202. Specifically, in one form, a first side tab 224A is provided at a first lateral side 226A of the first aperture 204 and a second side tab 224B is provided at a second lateral side 226B of the first aperture 204 opposite of the first lateral side 224A. Accordingly, the cavity 104 formed by the notch lamination 200 and the tab lamination 202 having the pair of side tabs 224A, 224B and 220A, 220B, respectively, laterally align the magnet(s) disposed in the cavity 104.

Figure 5A:
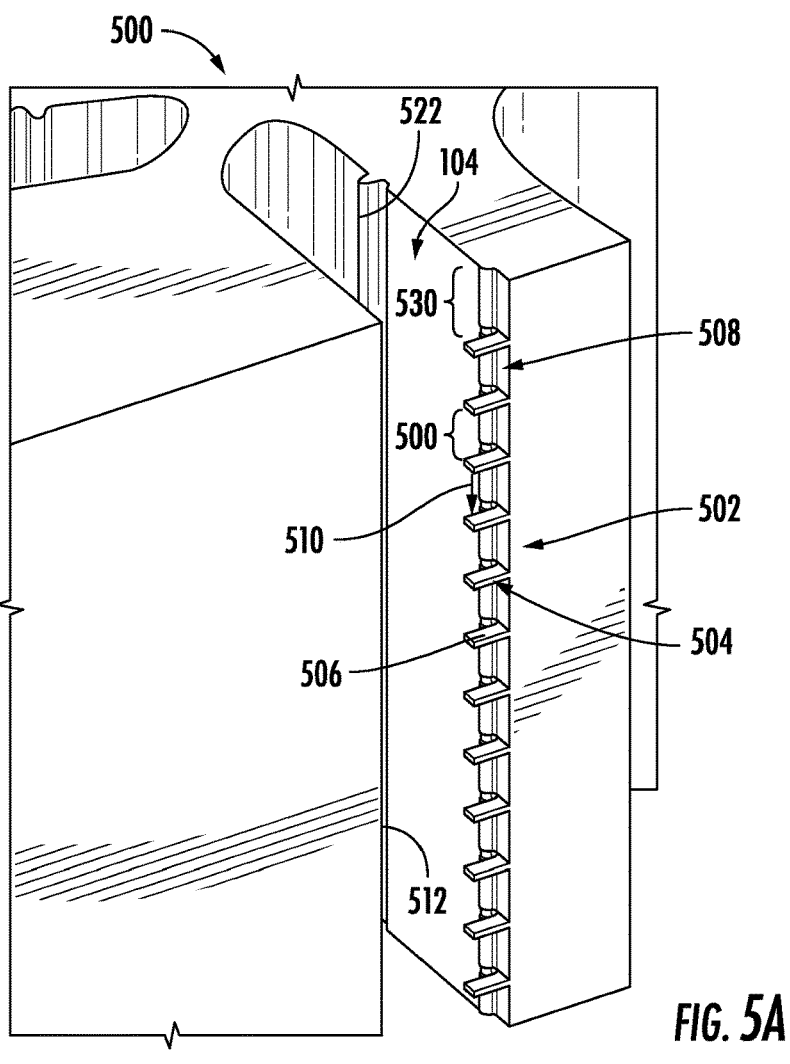
FIG. 5A is a partial cross-sectional view of the rotor core having a plurality of subset of stacked laminations in accordance with the present disclosure.
Figure 5B:
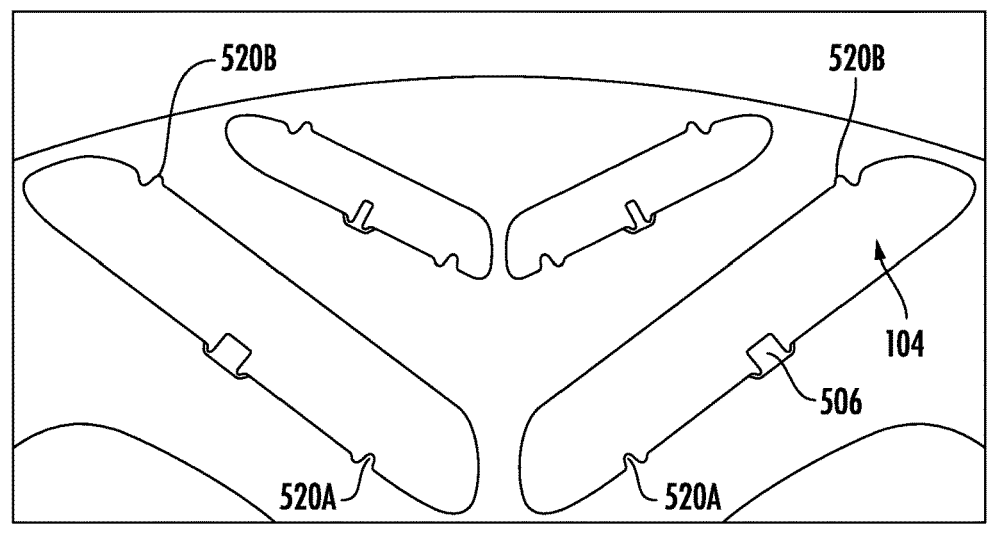
FIG. 5B is a partial top view of the rotor core of FIG. 5A.

While the pair of side tabs 224A, 224B and 220A, 220B are illustrated as being on the same side of the aperture 204,208 in at least FIGS. 2A and 2B, the pair of side tabs 224A, 224B and 220A, 220B may be provided on opposing sides of the aperture 204, 208 (see FIG. 5B). While FIGS. 2A and 2B illustrate the notch lamination 200 and the tab lamination 202 as having the pair of side tabs 224A, 224B, 220A, 220B, the side tabs 224A, 224B, 220A, 220B are not required and may be removed from one of or both of the notch lamination 200 and tab lamination 202.

In some applications, one tab lamination may be employed as an end lamination to stop or inhibit the magnet 106 from falling out of the cavity 104. In a non-limiting example, the rotor core 102 includes at least two tab laminations 202, where one tab lamination is provided as the end lamination 120B. Specifically, the magnet 106 does not pass the flexible tabs 210 of the end lamination 120B, and thus, the flexible tabs 210 abut with the magnet 106 and operate as stoppers. For example, if employing a mandrel during assembly, the end lamination 120B abuts with the surface of the mandrel. When the magnet 106 is inserted, the magnet 106 is inhibited from bending the flexible tab 210 due to the mandrel. The stack of laminations having the magnets may be removed from the mandrel with the flexible tabs 210 of the end lamination 120B blocking the magnet 106 from falling out.

In some applications, in lieu of having the tab lamination 202 as the end lamination 120B, the plurality of laminations 120 may include a separate laminate adapted to support the magnet 106. In a non-limiting example, referring to FIG. 4, a stopper lamination 400 defines a third aperture 402 and includes obstruction tab 404A, 404B extending toward or into the third aperture 402. Once stacked, the third aperture 402 of the stopper lamination 400 axially aligns with the first and second apertures 204, 208 to form a portion of the cavity 104. The obstruction tabs 404A,404B is adapted to inhibit the magnet 106 from passing through the cavity 104, and therefore may be bigger in size than the flexible tabs 210 of the tab lamination 202.

The stacking arrangement and the number of tab laminations 202 employed is selectable based on, for example, the dimensions of the rotor core 102, number of magnets 106 provided in the cavities 104, assembly process of the rotor assembly 100, performance objectives, and/or application of the rotor assembly 100. In a non-limiting example, the rotor core 102 may include two subsets of stacked laminations forming a first portion the rotor core 102 and a second portion of the rotor core 102, where the first portion and the second portion may be separated by additional notch laminations 200. Accordingly, the rotor core 102 may support the magnets 106 in the cavities 104 using flexible tabs 210 located at different portions of the rotor core 102.

As provided above, in some applications, the rotor core 102 may be adapted to secure the magnets 106 within the cavities 104 without the use of added fastening mechanism. Specifically, the rotor core 102 includes an array of flexible tabs adapted to bias the magnet towards an inner surface of the cavity 104.

Referring to FIGS. 5A and 5B, in a non-limiting example, the rotor core 102 may include a plurality of subset of stacked laminations 500 including a set of notch laminations 502 and a tab lamination 504. The plurality of subset of stacked laminations form an array of flexible tabs 506 and define multiple depressions 508 axially along the cavity 104.

The flexible tabs 506 are aligned at a center portion of the cavity 104 (FIG. 5B). Each flexible tab 506 aligns with a respective depression 508. The flexible tabs 506 are adapted to bend toward the associated depression as indicated by arrow 510 when the magnet 106 is inserted. The flexible tabs 506 contact and bias the magnet 106 toward an inner surface 512 of the cavity 104.

In some applications, the tab lamination 504 and the set of notch laminations includes a pair of side tabs on opposing sides of the apertures to form a pair of lateral edges axially extending along the cavity 104 to retain the magnet 106 therebetween. For example, FIG. 5B illustrate a pair of side tabs 520A, 520B that are similar to the side tabs 220A,220B, 224A,224B of FIGS. 2A and 2B, except the side tabs 520A and 520B are on opposing sides of a respective aperture. As illustrated in FIG. 5A, the side tabs 520A forms a lateral edge 522A axially extending along the cavity 104. A similar lateral edge is provided by the side tabs 520B on the opposing side of the cavity 104.

While illustrated on opposing sides of respective aperture, the pair of side tabs 520A,520B can be provided on the same side of the respective aperture.

In some application, a second set of notch laminations 530 are stacked and axially arranged above the first subset of stacked laminations 500 (FIG. 5A). The second set of notch laminations form a portion of the lateral edges of the cavities 104 and may operate as an inlet or opening to the cavity 104 for the magnet 106. Stated differently, during assembly, the magnet 106 may align with the respective cavity 104 via the inlet prior to engaging with the flexible tabs 506.

While the position of the flexible tabs 506 is provided at a center portion of cavity 104, the flexible tab may be provided at other suitable locations. Specifically, an array of flexible tabs may be provided closer to the center axis 110 of the rotor core 102.

Referring to FIGS. 6A and 6B, the rotor core 102 may include a plurality of subset of stacked laminations 600 including a set of notch laminations 602 and a tab lamination 604. The plurality of subset of stacked laminations 600 forms an array of flexible tabs 606 and defines multiple depressions 608 axially along the cavity 104.

In one form, the depression 608 of the set of notch laminations 602 is provided at a first lateral side of the 610A of the cavity 104, where the first lateral side 610 is provided closer to the central axis 110 of the rotor core than a second lateral side 610B of the cavity 104 (FIG. 6B). Specifically, each notch lamination defines a first aperture having a notch arranged at a first lateral side of the first aperture.

In some applications, each notch lamination may also include a side tab provided at a second lateral side of the first aperture opposite of the first lateral side. The side tabs of the set of notch laminations 602 forms a lateral edge axially extending along the cavity similar to the lateral edge 522 of FIG. 5A. The lateral edge forms a stopper to inhibit the magnet 106 from radially moving outward.

The flexible tabs 606 are aligned at the first lateral side 610A of the cavity 104. Accordingly, for each tab lamination 606, the flexible tab 606 is arranged at a first lateral side of the second aperture of the tab lamination 606. In one form, the flexible tab 606 has a hook-like configuration. That is, the flexible tab 606 extends from a longitudinal side of the second aperture and bends to be substantially parallel to the longitudinal side (FIG. 6B).

In addition to the plurality of subset of stacked laminations 600, the rotor core 102 includes a plurality of side tab laminations 620. Each side tab lamination 620 defines a plurality of third apertures 622 that form a portion of the cavity 104. Each side tab lamination 620 further includes a pair of side tabs 624A, 624B. Similar to the pair of side tabs 220A, 220B, 224A, 224B of FIG. 2A and 2B, a first side tab 624A is provided at the first lateral side of the third aperture 622 and a second side tab 624B is provided at a second lateral side of the third aperture 622 opposite of the first lateral side, where the first side tab 624A is closer the center axis 110 than the second side tab 624B. While the pair of side tabs 624 are illustrated on opposing sides, the pair of side tabs 624 may be provided on the same side of the third aperture 622.

In one form, the plurality of side tab laminations 620 are stacked together forming a pair of lateral stops. For example, the first side tabs 624A form a first lateral stop 626 that axially extends along a portion of the first lateral side 610A of the cavity 104. Similarly, the second side tabs 624B form a second lateral stop that extend along a portion of the second lateral side of the cavity 104.

In one form, the plurality of side tab laminations 620 are axially stacked above the plurality of subset of stacked laminations 600. When stacked, the plurality of third apertures of the plurality of side tab laminations 620 align with the first apertures of the notch laminations 602 and the second apertures of the tab laminations 604 forming at least a portion of the cavities 104 of the rotor core 102.

Furthermore, the flexible tabs 606 axially align with the first side tabs 624A. The flexible tab 606 is adapted to extend beyond a distal end of the first side tab 624A of the side tab lamination 620. Each flexible tab 606 aligns with a respective depression 608. Accordingly, the first lateral sides and the second lateral sides of the laminations 602, 604, and 620 align to have the flexible tab 606 align with the first side tab 624A, and the depression 608 defined by the notches of the set of notch laminations 602.

During assembly, the flexible tabs 606 are adapted to bend toward the associated depression 608 as indicated by arrow 630 when the magnet 106 is inserted. The flexible tabs 606 are adapted to contact and bias the magnet 106 toward an inner surface 512 of the cavity 104, and more specifically, toward the second lateral side of the cavity 104 having the second lateral stop.

Stated differently, the array of flexible tabs 606 exert a biasing force onto the magnet 106 to push the magnet 106 toward the second side tabs 624B and secure the magnet 106 within the cavity 104. In operation, as the rotor assembly 100 rotates, a radially outward rotational force may be exerted onto the magnets 106. The array of flexible tabs 606 provided along an inner lateral portion of the cavity 104 (i.e., a first lateral side) maintain contact with the magnet 106 pushing the magnet 106 toward an outer lateral portion of the cavity 104 (i.e., the second lateral side).

In some applications, the array of flexible tabs 506 of FIGS. 5A and 5B, which may be referred to a flexible center tabs, and the array of flexible tabs 606 of FIG. 6A and 6B, which may be referred to as flexible side tabs, may be employed together to retain and secure the magnet 106 in the cavity 104. For example, FIG. 7 illustrates stacked laminations having flexible center tabs 702 and flexible side tabs 704. In accordance with the present disclosure: a tab lamination may include the flexible center tab 702 and the flexible side tab 704; a notch lamination defines multiple notches to form depressions for the flexible center tab 702 and the flexible side tab 704; and a side tab lamination includes the pair of side tabs 706.

While exemplary embodiments are described above, it is not intended that these embodiments describe all possible forms of the invention. For example, a stopper lamination of FIG. 4 may be provided with the rotor core configuration of FIGS. 5A, 5B, 6A, 6B,and/or 7. Rather, the words used in the specification are words of description rather than limitation, and it is understood that various changes may be made without departing from the spirit and scope of the invention. Additionally, the features of various implementing embodiments may be combined to form further embodiments of the invention.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A rotor assembly for an electric motor, comprising:
a rotor core defining a plurality of cavities and comprising a plurality of laminations, and
a plurality of magnets provided in the plurality of cavities wherein:
the plurality of laminations has annular bodies and includes:
a plurality of notch laminations each defining a plurality of first apertures, wherein each first aperture has a notch at a portion of the first aperture,
a plurality of tab laminations each defining a plurality of second apertures and including a plurality of flexible tabs extending towards the second apertures, and
a plurality of side tab laminations each defining a plurality of third apertures and including a pair of side tabs extending toward each third aperture, a first side tab being provided at a first lateral side of the third aperture and a second side tab being provided at a second lateral side of the third aperture opposite of the first lateral side, and the first side tab being closer to a center of the annular body than the second side tab, the plurality of first, second, and third apertures define at least a portion of the plurality of the cavities,
a set of the notch laminations are stacked with at least one tab lamination, wherein the notches align with a set of flexible tabs among the plurality of flexible tabs the set of flexible tabs bends toward the notches by the magnet,
at least one side tab lamination among the plurality of side tab laminations is arranged above the at least one tab lamination,
the magnet is laterally retained between the first side tab and the second side tab,
the plurality of flexible tabs includes a flexible side tab that vertically aligns with and is under the first side tab, and
the flexible side tab bends away from the first side tab by the magnet.

2. The rotor assembly of claim 1, wherein the plurality of laminations further includes a stopper lamination defining a plurality of fourth apertures, each fourth aperture has at least one tab extending into the fourth aperture, wherein the stopper lamination is provided as an end lamination of the rotor core and is adapted to retain the magnets in the cavities by the tabs.

3. The rotor assembly of claim 1, wherein:
a subset of stacked laminations includes one tab lamination and the set of the notch laminations, and
the subset of stacked laminations is arranged at a first end of the rotor core and a second tab lamination from among the plurality of tab laminations is provided as an end lamination at a second end of the rotor core opposite of the first end to abut with and retain the magnet.

4. The rotor assembly of claim 1, wherein:
a portion of the plurality of laminations form a plurality of subset of stacked laminations,
each subset of stacked laminations includes one tab lamination and the set of the notch laminations stacked with the one tab lamination, and
the flexible tabs of the plurality of subset of stacked laminations form an array of the flexible tabs along the cavities and are adapted to contact and bias the magnet toward an inner surface of the cavity.

5. The rotor assembly of claim 1, wherein:
the at least one tab lamination includes a second pair of side tabs at each secondary aperture,
the second pair of side tabs extend toward the second aperture,
a first side tab of the second pair of side tabs is provided at a first lateral side of the second aperture and a second side tab of the second pair of side tabs is provided at a second lateral side of the second aperture opposite of the first lateral side, and
the magnet is retained between the second pair of side tabs.

6. The rotor assembly of claim 1, wherein:
the plurality of magnets includes a first set and a second set of magnets, wherein the first set of magnets are smaller than the second set of magnets, and
the plurality of cavities includes a first set of cavities having the first set of magnets and a second set of cavities having the second set of magnets.

7. The rotor assembly of claim 1, wherein:
a portion of the plurality of laminations form a subset of stacked laminations,
each subset of stacked laminations includes one tab lamination from among the plurality of tab laminations and the set of the notch laminations stacked with the one tab lamination,
the rotor core includes a plurality of the subset of stacked laminations, and
the flexible tabs of the plurality of the subset of stacked laminations form an array of the flexible tabs along the cavities and are adapted to contact and bias the magnet toward an inner surface of the cavity.

8. The rotor assembly of claim 1, wherein the flexible tabs of the tab lamination includes a flexible center tab provided at a center portion of the second apertures.

9. The rotor assembly of claim 8, wherein:
each tab lamination includes the flexible side tab
a portion of the plurality of laminations form a subset of stacked laminations,
the subset of stacked laminations includes one tab lamination and the set of the notch laminations stacked with the one tab lamination,
the rotor core includes a plurality of the subset of stacked laminations, and
the flexible center tabs and the flexible side tabs of the plurality of the subset of stacked laminations form an array of the flexible center tabs and an array of the flexible side tabs along the cavities and are adapted to contact and bias the magnet toward an inner surface of the cavity.

10. The rotor assembly of claim 1, wherein:
each first aperture of the notch lamination among the plurality of notch laminations has a plurality of the notches, and at least one second tab lamination among a plurality of tab laminations includes a plurality of the flexible tabs that align with the plurality of the notches.

11. A rotor assembly for an electric motor, the rotor assembly comprising:

a rotor core defining a plurality of cavities and comprising a plurality of laminations; and a plurality of magnets arranged in the plurality of cavities, wherein:

the plurality of laminations has annular bodies and includes:

a plurality of notch laminations each defining a plurality of first apertures, wherein each first aperture has a notch at a portion of the first aperture, a plurality of tab laminations each defining a plurality of second apertures and including at least one flexible tab extending toward the second apertures, and a plurality of side tab laminations each defining a plurality of third apertures and including a pair of side tabs extending toward the third aperture, a first side tab being provided at a first lateral side of the third aperture and a second side tab being provided at a second lateral side of the third aperture opposite of the first lateral side, and the first side tab being closer to a center of the annular body than the second side tab, a portion of the plurality of laminations form a subset of stacked laminations, the subset of stacked laminations includes one tab lamination and a set of notch laminations from among the plurality of notch laminations stacked with the one tab lamination, the first apertures, the second apertures, and the third apertures align with each other to form a portion of the plurality of cavities, at least one side tab lamination among the plurality of side tab laminations is arranged above the at least one tab lamination, the magnet is laterally retained between the first side tabs and the second side tabs of the plurality of side tab laminations, the at least one flexible tab includes a flexible center tab provided at a center portion of the second apertures and a flexible side tab vertically aligns with and is under the first side tab, the flexible side tab bends away from the first side tab by the magnet, and the flexible center tab bends towards the notches of the set of notch laminations by the magnet.

12. The rotor assembly of claim 11, wherein:

the rotor core includes a plurality of the subset of stacked laminations, and the flexible tabs of the plurality of the subset of stacked laminations form an array of the flexible tabs along the cavities that are adapted to contact and bias the magnet in the cavity toward an inner surface of the cavity.

13. The rotor assembly of claim 11, wherein:

the subset of stacked laminations is arranged at a first end of the rotor core, and a second tab lamination from among the plurality of tab laminations is provided as an end lamination at a second end of the rotor core opposite of the first end to abut with and retain the magnet.

14. The rotor assembly of claim 11, wherein:

each first aperture of the notch lamination has a plurality of the notches, and each tab lamination includes a plurality of the flexible center tabs that align with the plurality of the notches of the notch lamination.

15. The rotor assembly of claim 1, wherein the first side tab is provided at an opposing side of the third aperture as the second side tab.

16. The rotor assembly of claim 11, wherein the first side tab is provided at an opposing side of the third aperture as the second side tab.

* * * * *